United States Patent [19]

Chang Soo et al.

[11] Patent Number: 5,446,505
[45] Date of Patent: Aug. 29, 1995

[54] COLOR TELEVISION SYSTEM HAVING BROADCAST PROGRAM ADAPTIVE VIDEO/AUDIO ADJUSTMENT APPARATUS

[75] Inventors: Hong Chang Soo; Cho Min Soo, both of Seoul, Rep. of Korea

[73] Assignee: Daewoo Electronics Co., Ltd., Seoul, Rep. of Korea

[21] Appl. No.: 194,472

[22] Filed: Feb. 9, 1994

Related U.S. Application Data

[63] Continuation-in-part of Ser. No. 8,262, Jan. 25, 1993, abandoned, which is a continuation-in-part of Ser. No. 518,944, May 4, 1990, abandoned.

[30] Foreign Application Priority Data

| May 6, 1989 | [KR] | Rep. of Korea | 89-6076 |
| Jun. 21, 1989 | [KR] | Rep. of Korea | 89-8530 |
| Jun. 23, 1989 | [KR] | Rep. of Korea | 89-8700 |

[51] Int. Cl.⁶ .................................... H04N 5/60
[52] U.S. Cl. .................................... 348/738; 348/563; 348/649; 348/695
[58] Field of Search ............... 348/734, 738, 673, 656, 348/649, 563, 569, 468, 484, 485, 695; H04N 5/60, 5/445, 5/57; 381/101, 103

[56] References Cited

U.S. PATENT DOCUMENTS

| 4,654,717 | 3/1987 | Stoughton | 348/673 |
| 4,712,105 | 12/1987 | Köhler | 348/734 |
| 4,903,307 | 2/1990 | Ozawa et al. | 381/103 |
| 5,173,778 | 12/1992 | Sasaki et al. | 348/569 |
| 5,191,421 | 3/1993 | Hwang et al. | 348/649 |
| 5,241,696 | 8/1993 | Mori et al. | 381/103 |

*Primary Examiner*—James J. Groody
*Assistant Examiner*—Jeffrey S. Murrell
*Attorney, Agent, or Firm*—William F. Pinsak

[57] ABSTRACT

Automatically fine tuned pictures and sounds can be obtained from a novel color television system having a video/audio signal adjusting circuit, a remote controller operable for generating a program mode selection signal, a memory having a plurality of memory locations for storing operating parameter data for the video and the audio processing circuit corresponding to program modes, a microprocessor responsive to the program mode selection signal for receiving the operating parameter data corresponding thereto and for generating an audio control signal and a video control signal, a video signal adjusting circuit responsive to the video control signal for adjusting the video signal to have a video characteristic corresponding to the program mode selection signal, and an audio signal adjusting circuit responsive to the audio control signal for adjusting the audio signal to have a frequency band characteristic corresponding to the program mode selection signal.

2 Claims, 4 Drawing Sheets

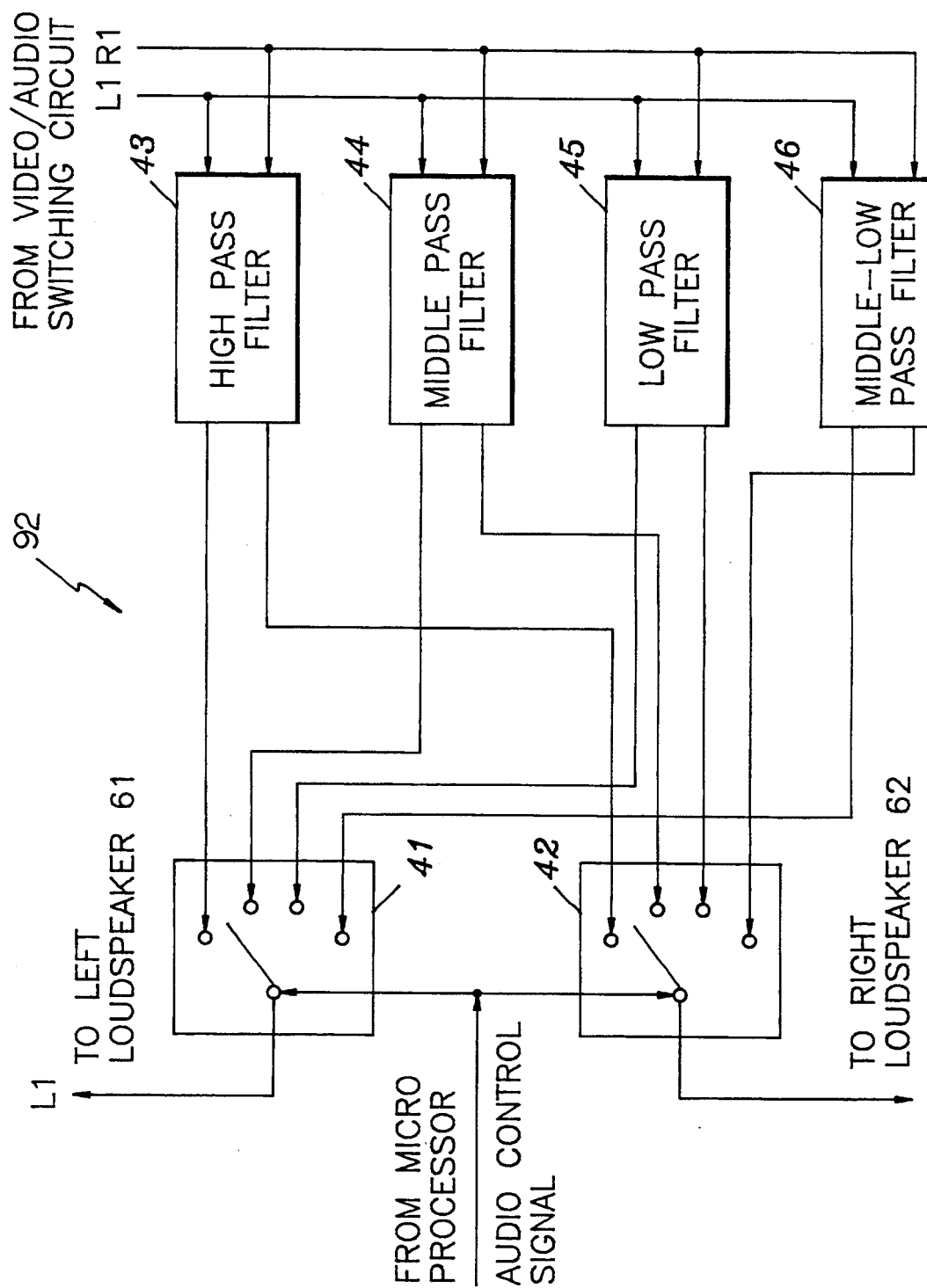

COLOR TELEVISION SYSTEM HAVING BROADCAST PROGRAM ADAPTIVE VIDEO/AUDIO ADJUSTMENT APPARATUS

CROSS REFERENCE TO RELATED APPLICATION

This application is a continuation-in-part of U.S. Ser. No. 08/008,262 filed on Jan. 25, 1993, now abandoned, which is in turn a continuation-in-part of U.S. Ser. No 07/518,944 filed on May 4, 1990 now abandoned.

FIELD OF THE INVENTION

The present invention relates to a color television system; and, more particularly, to a video/audio adjustment apparatus for use in the color television system which is capable of automatically adjusting a video signal and/or audio signal in a broadcast program.

DESCRIPTION OF THE PRIOR ART

The conventional television receivers generally include a "picture/sound adjuster" for controlling the operating parameters of a video and an audio signal processing circuits to obtain a picture on their screen and a sound via their loudspeakers. Typically, the picture/sound adjuster includes a plurality of mechanical levers, e.g., a contrast adjust lever, a brightness adjust lever, a color adjust lever, a tint adjust lever, a sharpness adjust lever and an audio frequency band selection lever for adjusting the operating parameters of the video and the audio processing circuits. Therefore, viewers are required to operate the above-listed respective mechanical levers in their television receiver, while watching their television set, to adjust or fine tune video and/or audio signals contained in a received broadcast signal.

The number of broadcasting programs for television receivers has increased in recent years to include movies, drama, news, sports and the like. Each different type of the broadcast programs may include different or unique characteristics in its video and/or audio signals. The video characteristic may be represented in terms of a particular contrast level, brightness level, color level, tint level and sharpness level, while the sound characteristic may be represented in terms of a particular frequency band. Thus, in order for the user to obtain a finely tuned picture and sound, it is desirable to allow the video and audio signals to be adjusted corresponding to the video and audio characteristics of a given broadcast program.

However, when the adjustment of these operating parameters is to be made manually by the user according to the type or characteristics of so diverse broadcast programs received by the television receiver through the use of the mechanical picture/sound adjuster, the task may become excessively or unduly complex.

Furthermore, such complex task of adjustment may confuse an ordinary user who may be unfamiliar with the mechanics of the adjuster and may frustrate him with a difficult burden of the adjuster operation.

SUMMARY OF THE INVENTION

It is, therefore, an object of the invention to provide a color television system having a video/audio signal adjusting apparatus which is capable of providing a finely tuned picture and sound for each type of broadcast programs.

Another object of the invention is to provide a color television system having a video/audio signal adjusting apparatus which is capable of providing a convenient adjustment of the video and the audio signal processing circuits contained therein for each type of broadcast programs.

In accordance with one embodiment of the present invention, there is provided a color television system having a video and an audio processing circuits for receiving and reproducing a broadcast program having an audio and a video signals, which comprises: a remote controller operable for generating a program mode selection signal; a memory having a plurality of memory locations for storing predetermined operating parameter data for the video and the audio processing circuits corresponding to the program mode; a microprocessor responsive to the program mode selection signal for receiving the operating parameter data corresponding thereto and for generating an audio and a video control signals; a video signal adjust circuit responsive to the video control signal for adjusting the received video signal to have a video characteristic corresponding to the program mode selection signal; and an audio signal adjusting circuit responsive to the audio control signal for adjusting the received audio signal to have a frequency characteristic corresponding to the program mode selection signal.

In accordance with another embodiment of the present invention, the remote controller includes a program mode selection key and a plurality of digit keys and the television system further comprises an OSD(on-screen display) character generator responsive to the operation of the program mode selection key for displaying a numbered list of the program modes and for enabling the digit keys to select the program modes.

BRIEF DESCRIPTION OF THE DRAWINGS

The above and other objects and features of the present invention will become apparent from the following description of preferred embodiments given in conjunction with the accompanying drawing, in which:

FIGS. 4 is provides a detailed diagram of the audio signal adjusting circuit shown in FIG. 1.

DETAILED DESCRIPTION OF THE PREFERRED EMBODIMENTS

Figure 1:
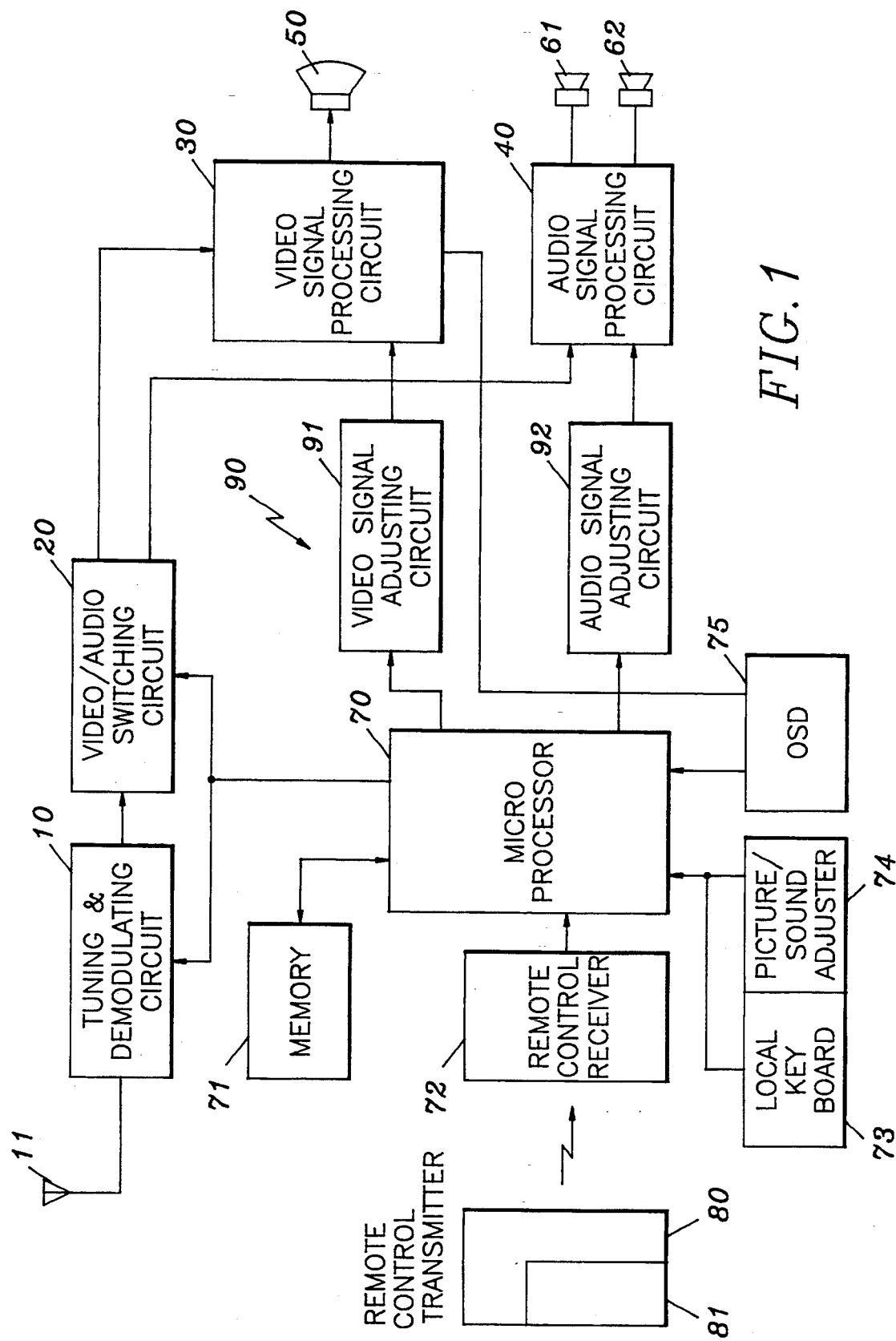
FIG. 1 shows a schematic block diagram of the video/audio adjustment apparatus for use in a color television receiver in accordance with the present invention.

Referring to FIG. 1, there is shown a schematic block diagram of the video/audio adjustment apparatus useful in a color television receiver in accordance with the present invention. The color television receiver generally includes a tuning and demodulating circuit 10, a video/audio switching circuit 20, a video signal processing circuit 30, an audio signal processing circuit 40, a picture tube 50, loudspeakers 61 and 62, and a microprocessor 70.

Broadcast signals received through various respective channels, as is well known in the art, are coupled via antenna 11 to the tuning and demodulating circuit 10 which serves to select a broadcast signal corresponding to a particular channel and to demodulate the selected broadcast signal to form an video and an audio signals. The channel selection operation is achieved by activating a channel selection key contained in a local keyboard 73 or a remote keyboard 81 by the user. The video and audio signals are coupled via the video/audio switching circuit 20 to the video processing circuit 30 and the audio signal processing circuit 40. The video signal is processed by the video signal processing circuit 30 to form red, green and blue (R, G, B) color signals which are adjusted by the operating parameters thereof and coupled to an electron gun of the picture tube 50. The operating parameters of the video signal processing circuit 30 include contrast, brightness, color, tint, and sharpness which can be set by the user through the use of a "mechanical picture/sound adjuster" 74. The electron beams produced by the picture tube are swept in raster to form a picture on its screen corresponding to a particular broadcast program received through the selected channel. The audio signal is processed by the audio signal processing circuit 40 in which it is adjusted by the operating parameters thereof which also can be adjusted by user through the use of the mechanical picture/sound adjuster 74. The adjusted audio signal is coupled to the loudspeakers 61 and 62 to produce an audio response corresponding to the particular broadcast program of the selected channel.

The "mechanical picture/sound adjuster" 74 serves to control the operating parameters of the video and the audio signal processing circuits 30 and 40 to form a finely tuned picture on the screen of the picture tube 50 and a finely tuned response via the loudspeakers 61 and 62. Typically, The mechanical picture/sound adjuster includes a plurality of mechanical levers, e.g., a contrast adjust lever, a brightness adjust lever, a color adjust lever, a tint adjust lever, a sharpness adjust lever and an audio frequency band selection lever for adjusting the operating parameters of the video and the audio processing circuits 30 and 40. These levers are coupled to the video and audio processing circuits 30 and 40 directly or via the microprocessor 70; and the user manually operates the above-listed respective mechanical levers in his television receiver, while watching the television program.

Various functions of the television receiver can be controlled by the user through the use of either a local keyboard 73 mounted on the television receiver itself or a remote keyboard 81 mounted on a remote control transmitter 80. Each of the keyboards includes a plurality of normally opened push button switches. Each of the push button switches is closed when the user pushes an associated key. When a key on the local keyboard 73 is pushed, a corresponding coded signal is coupled to the microprocessor 70. When a key on the remote keyboard 81 is pushed, a remote control message is transmitted in the form of a digitally modulated infrared or ultrasonic carrier to a remote control receiver 72 which converts it to a correspondingly modulated electric carrier. The remote control receiver 72 also demodulates the modulated electric carrier to form a digital word representing the remote control message which is coupled in a serial form to microprocessor 70.

The microprocessor 70 controls the various operation of the television receiver including turning the television on and off, controlling the channel selection operation of the tuning and demodulating circuit 10, and controlling the switching operation of the video/audio switching circuit 20. Because of the large number of functions to be controlled by the microprocessor 70, only those connections of the microprocessor 70 related to the video/audio signal adjusting function, with which the present invention is specifically concerned, are shown in FIG. 1.

Broadcast programs for television receivers include movies, drama, news, sports and the like. Each type of the broadcast programs normally includes video and audio signals which have respective unique characteristics. The video characteristic may be represented in terms of a particular contrast level, brightness level, color level, tint level and sharpness level, while the sound characteristic may be represented in terms of a particular frequency band. In order to obtain a more finely tuned picture and/or audio response, it may be desirable to adjust the operating parameters corresponding to the video and audio characteristics of a particular type of broadcast program. Consequently, the television receiver normally has a plurality of program modes, e.g., movie mode, drama mode, news mode, and sports mode.

In accordance with a preferred embodiment of the present invention, the television receiver includes a video/audio signal adjust circuit 90 for selectively adjusting the operating parameters of the video and the audio processing circuits 30 and 40 corresponding to the program modes. The video/audio signal adjusting circuit 90 includes a video and an audio signal adjusting circuits 91 and 92. The remote keyboard of the remote control transmitter 73 includes a program mode selection switch to control the operating parameters of the video and the audio signal processing circuits 30 and 40.

A memory block 71 has a plurality of memory locations for storing operating parameter data for the video processing circuit 30 corresponding to each of the program modes, which are experimentally preset in such a manner that the quality of a picture corresponding to each program mode is better improved. The operating parameter data for the video signal processing circuit 40 is listed blow, wherein the data is preset for a particular video signal processing circuit 30, e.g., LA7621 integrated circuit manufactured by SANYO of Japan. The operating parameters for the video signal processing circuit 30, i.e., brightness levels, contrast levels, color levels, tint levels, and sharpness levels are experimentally determined and are converted into a set of digital data which is sequentially stored in the memory block 71 (the digital data is preferably represented by 6 bit digital data).

TABLE 1

|  | Bright | Contrast | Color | Tint | Sharpness |
|---|---|---|---|---|---|
| Drama | 31 | 39 | 32 | 34 | 33 |
| News | 15 | 18 | 15 | 20 | 17 |
| Sports | 45 | 50 | 48 | 52 | 56 |
| Movies | 24 | 32 | 28 | 35 | 28 |

The memory block 71 also includes a plurality of memory locations for storing the operating parameter data for the audio processing circuit 40 corresponding to each of the program modes, which are experimentally preset in such a manner that the quality of an audio response corresponding to each program mode is more improved. Each operating parameter data is represented by an audio frequency band. The operating parameter data for the audio signal processing circuit 40 is listed blow, wherein the data is experimentally preset for a particular video signal processing circuit 30 (the data is preferably represented by 2 bit digital data).

TABLE 2

|  | frequency band | frequency |
|---|---|---|
| Drama | middle frequency band | 2KHz-3KHz |
| Sports | low frequency band | less than 1KHz |
| News | high frequency band | more than 3KHz |
| Movies | mid-low frequency band | 1KHz-2KHz |

The operating parameters for the audio signal processing circuit 40, i.e., frequency band selection signals, are experimentally determined and are converted into a set of digital data which is sequentially stored in the memory block 71 corresponding to the operating parameters for the video processing circuit 30.

When a particular program mode is selected by the user through the use of the remote control transmitter 80, the program mode signal is coupled via the remote control receiver 72 to the microprocessor 70. The microprocessor 70 retrieves the operating parameter data for the video and the audio processing circuits 30 and 40 corresponding to the program mode selection signal and couples it to the video and the audio signal adjusting circuits 91 and 92 for controlling the operating parameters of the video processing circuit 30.

In order to enable the user to select a particular program mode out of various program modes with the program mode selection key, the television receiver may need be provided with detailed instructions displayed on the screen thereof for guiding the user. For this purpose, the television receiver includes an on-screen display (OSD) character generator 75 for generating signals representative of alpha-numeric characters in a video format suitable for displaying the characters on the screen thereof. The character generator 75 responds to command signals generated by the microprocessor 70 to generate the character representative signals. The microprocessor is responsive to the operation of the keys provided on the local keyboard 73 or the remote keyboard 81 to generate the command signals for the character generator 75.

The character generator 75 is responsive to horizontal(H) and vertical(V) sync pulses extracted by the video processing circuit 30 in order to position a chosen character on the screen of the television receiver. The character representative signals are coupled to the video signal processing circuit 30 in which the character representative signals are processed in the same manner as normal video signals, and the corresponding character is displayed on the screen of the picture tube 50. The selecting instructions can be displayed together with a normal image so that the user can continue to view a program during the selecting operation.

Figure 2A:
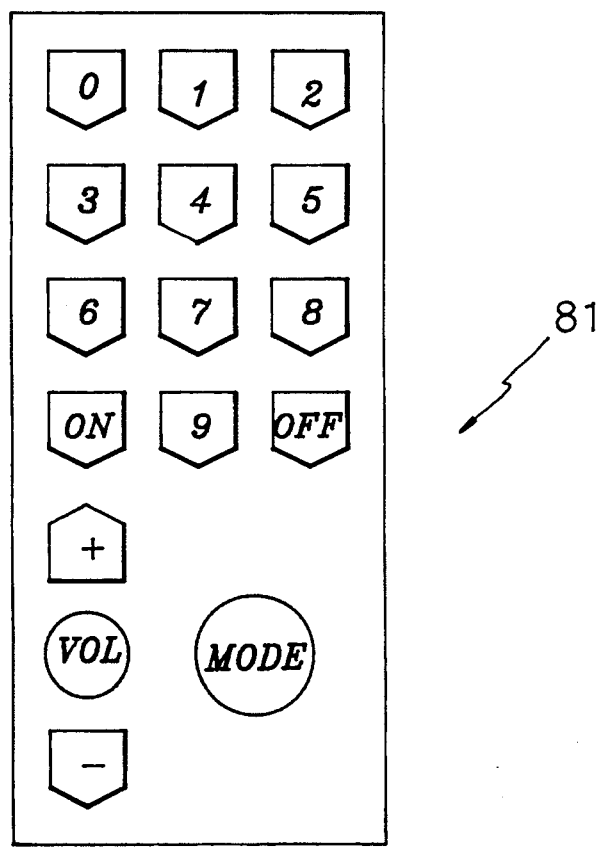
FIGS. 2A and 2B represent an exemplary remote keyboard and a explanatory diagram of the selection operation of the program modes by a user.
Figure 2B:
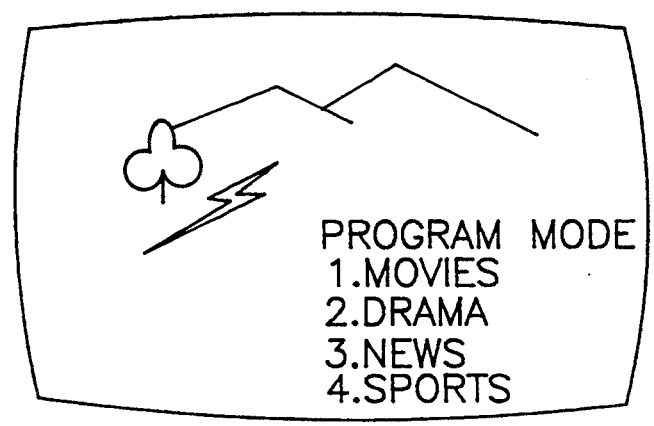

Referring to FIGS. 2A and 2B, There are shown an exemplary remote keyboard and a explanatory diagram depicting the selection operation of the program mode by the user. As is shown, the remote keyboard 81 includes ON, OFF, and VOL(volume) keys for controlling the television receiver. In addition, the remote keyboard 81 includes a MODE key for the program mode selection and keys corresponding to the digits 0 through 9 which are normally used to select channels. The digit keys are also used, as will be explained below, during the program mode selection operation.

The procedure to be followed by the user to select a program mode will now be described with reference to the information to be displayed on the screen of the television receiver. As indicated in FIG. 2B, the user may initiate the program mode selection operation by pressing the MODE key to obtain a finely tuned picture and audio response for a received broadcast program. Then, the microprocessor 70 causes the character generator 75 to generate character signals for displaying a program mode list on the screen. The list may appear as follows:

TABLE 2

| PROGRAM MODE |
|---|
| 1. MOVIES |
| 2. DRAMA |
| 3. NEWS |
| 4. SPORTS |

This list, with each of the various program modes identified by a respective number, may be call a "menu" for allowing the user to select the appropriate program mode. To select any one of the modes, the user merely has to push the corresponding digit key. After the generation of a display, such as the menu, prompting the user to enter a selection information, the keyboard entry subroutine contained in the microprocessor 70 allows a predetermined amount of time for the user to push the appropriate key and, if a key is not pushed during predetermined time, the selection operation is terminated. If the received broadcast program is a movie program and the 1" digit key is pushed after the menu has been displayed, the microprocessor 70 retrieves the operating parameter data corresponding to the movie program from the memory block 71 and couples it to the video and the audio signal adjusting circuits 91 and 92, respectively.

Figure 3:
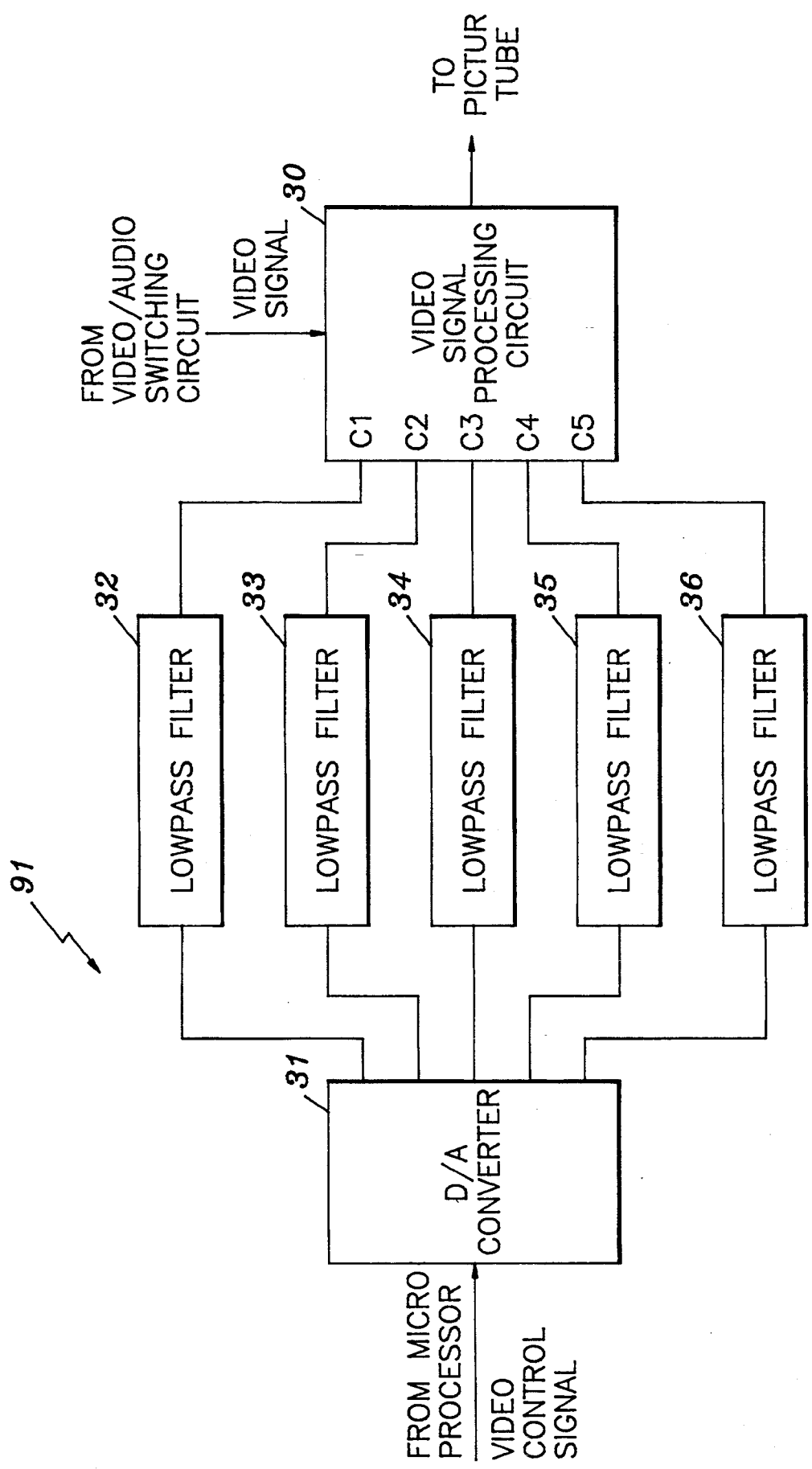
FIG. 3 depicts a detailed diagram of the video signal adjusting circuit shown in FIG. 1.

Referring to FIG. 3. There is shown a detailed diagram of the video signal adjusting circuit 91 shown in FIG. 1. The video signal adjusting circuit 91 includes a digital/analog(D/A) converter 31 and low pass filters 32, 33, 34, 35, and 36. The operating parameter data, i.e., the selected digital data from the microprocessor 70, is coupled to the D/A converter 31 in which it is converted into a set of pulse width modulation(PWM) signals. The PWM signals are then coupled to the respective low pass filters 32, 33, 34, 35, and 36 which are coupled to a contrast control port C1, a brightness control port C2, a color control port C3, a tint control port C4 and a sharpness control port C5 of the video signal processing circuit 30, respectively. As is well known in the art, the PWM signals are converted into a set of DC levels representative of the particular contrast level, brightness level, color level, tint level, and sharpness level by the respective filters 32, 33, 34, 35 and 36 and the DC levels serve to control the received video signal which is processed by the video processing circuit 30. The D/A converter for converting digital data into a set of PWM signals is made of conventional circuit components and the low pass filter may be readily implemented by those skilled in the art through the use of conventional circuit components.

Referring now to FIG. 4, the audio signal adjusting circuit 40 includes a first switching circuit 41 and a second switching circuit 42; and the audio signal processing circuit 40 includes a high pass band filter 43, a middle pass band filter 44, a low pass band filter 45 and a middle-low pass band filter 46. As is shown, the received audio signals i.e., a right audio signal R1 and a left audio signal L1 are simultaneously coupled to the filters 43, 44, 45 and 46. The right audio outputs from the respective filters 43, 44, 45 and 46 are coupled to the second switching circuit 42, while the left audio outputs from the respective filters 43, 44, 45 and 46 are coupled to the first switching circuit 41. The first and the second switching circuits 41 and 42 couple the right and the left audio outputs from the selected filters in response to the control signal representative of the selected frequency band from the microprocessor 70 to the loudspeakers 61 and 62. Because an audio signal characteristic mainly pertains to its frequency band characteristic, the selection of an output from a filter having a different frequency response may require the adjustment of the audio signal.

As can be seen from the above, the color television system in accordance with the present invention is capable of providing finely tuned pictures and sounds for each type of broadcast programs. Further, by employing the OSD function, the video/audio signal adjusting apparatus in accordance with the present invention can be easily implemented by the user so as to conveniently adjust the operating parameters for the video and the audio signal processing circuits contained therein for each type of broadcast programs.

While the invention has been shown in combination with an analog television system, it should be readily appreciated that the present invention can be equally employed in a digital television system. Further the audio and video signal adjustment function may be independently performed depending on the type of a given broadcast program.

While the present invention has been shown and described with reference to the particular embodiments, it will be apparent to those skilled in the art that many changes and modifications may be without departing from the spirit and scope of the invention as defined in the appended claims.

What is claimed is:

1. A color television system for receiving and reproducing a broadcast program having an audio and a video signals, which comprises:

remote control means operable for generating a program mode selection signal wherein the remote control means includes a program mode selection key and a plurality of digit keys;

character generating means responsive to the operation of the program mode selection key for generating character signals for displaying a selective list of program modes, and for enabling the digit keys to select the program modes;

memory means having a plurality of memory locations for storing operating parameter data for video and audio signal adjusting means corresponding to the program modes wherein the operating parameter data corresponding to the program modes includes a brightness level, a contrast level, a color level, a tint level, and a sharpness level;

microprocessor responsive to the program mode selection signal for receiving the operating parameter data corresponding thereto and for generating an audio and a video control signals representative of the operating parameter data;

video signal adjusting means responsive to the video control signal for adjusting the video signal to have a video characteristic corresponding to the program mode selection signal wherein the video signal adjusting means includes a digital/analog converter for converting the video control signal into a set of pulse width modulation signals and a plurality of low pass filters for generating DC level signals corresponding to the pulse width modulation signals; and audio signal adjusting means responsive to the audio control signal for adjusting the audio signal to have a frequency band characteristic corresponding to the program mode selection signal wherein the audio signal processing means includes a high pass filter, a middle pass filter, a middle-low pass filter and a low pass filter; and includes a switching circuit responsive to the audio control signal for selecting one of the outputs from the filters.

2. A color television system for receiving and reproducing a broadcast program having an audio and a video signals, which comprises:

remote control means operable for generating program mode selection signal wherein the remote control means includes a program mode selection key and a plurality of digit keys;

character generating means responsive to the operation of the program mode selection key for generating character signals for displaying a selective list of program modes, and for enabling the digit keys to select the program modes;

memory means having a plurality of memory locations for storing operating parameter data for video signal adjusting means corresponding to the program modes wherein the operating parameter data corresponding to the program modes includes a brightness level, a contrast level, a color level, a tint level, and a sharpness level;

microprocessor responsive to the program mode selection signal for receiving the operating parameter data corresponding thereto and for generating a video control signals representative of the operating parameter data; and video signal adjusting means responsive to the video control signal for adjusting the video signal to have a video characteristic corresponding to the program mode selection signal wherein the video signal adjusting means includes a digital/analog converter for converting the video control signal into a set of pulse width modulation signals and a plurality of low pass filters for generating DC level signals corresponding to the pulse width modulation signals.

* * * * *